C. W. MILLS.
Can-Protector.
No. 218,187.              Patented Aug. 5, 1879.
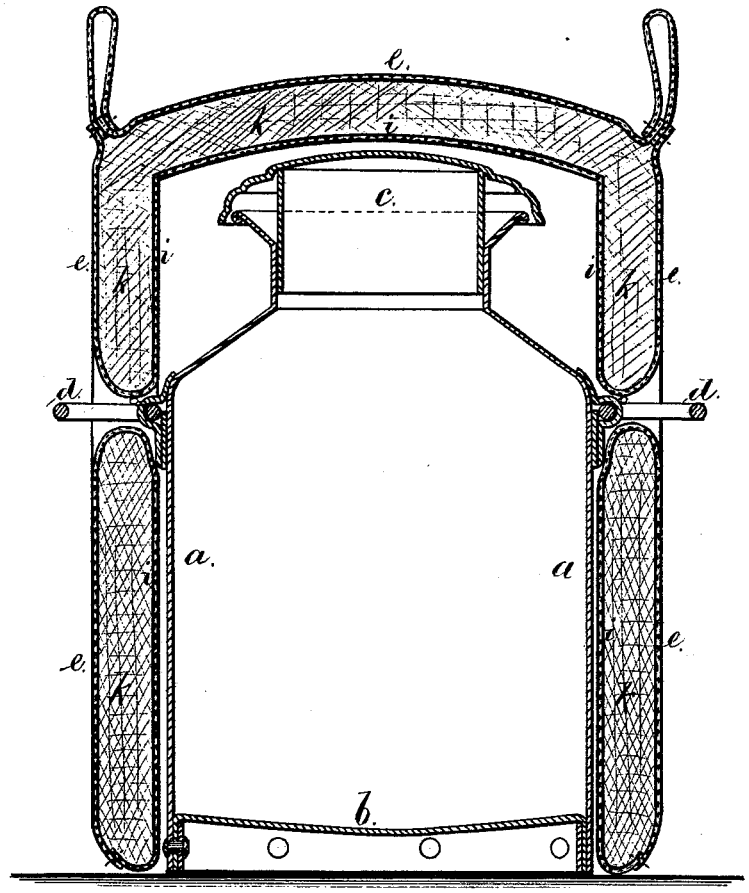

UNITED STATES PATENT OFFICE.

CLARK W. MILLS, OF POMPTON, NEW JERSEY.

IMPROVEMENT IN CAN-PROTECTORS.

Specification forming part of Letters Patent No. 218,187, dated August 5, 1879; application filed January 27, 1879.

*To all whom it may concern:*

Be it known that I, CLARK W. MILLS, of Pompton, in the county of Passaic and State of New Jersey, have invented an Improvement in Means for Protecting Milk and other Cans, of which the following is a specification.

In the transportation of milk to market sheet-metal cans in great varieties have been employed, and in warm weather it is usual to stand the milk-cans into running spring-water in a cool milk-house, in order to reduce the animal heat and prevent the milk becoming sour; but after the cans are removed for transportation they are generally exposed more or less to the light and heat of the sun, and also to the warmth of the cars, whereby the milk becomes injured before its reception by the consumer.

My invention is for preventing the action of heat upon the milk-can, and also for protecting the can from injury by the rough handling to which it is subjected in transportation; and this I accomplish by a non-conducting case or jacket that envelops the can.

In the drawing I have represented the can and jacket by a vertical section.

The sides $a$, bottom $b$, cover $c$, and handles $d$ are of any usual or desired character, and form an ordinary milk-can.

The non-conducting jacket is formed of an outer layer of strong sail-cloth or duck $e$, and the lining $i$ is preferably of a similar material, and between these there is a layer of felt, $k$, or similar non-conducting material.

The jacket is made cylindrical, with a circular top, so as to be set over the can from the top, and there are side openings at the proper places for the handles $d$ to pass through, so as to allow the cans to be taken by the handles, as usual.

The parts of the jacket are to be properly stitched together, and the jacket made strongly, so that it will not be injured in handling, and not only is the can protected from the heat, but injury to the can from concussion is materially lessened.

The jacket is easily drawn over the can previous to transportation, and removed from the same previous to opening the can.

I claim as my invention—

The non-conducting jacket for milk and other cans formed of flexible material, to be drawn over the can, and with openings for the handles, substantially as set forth.

Signed by me this 23d day of January, A. D. 1879.

C. W. MILLS.

Witnesses:
    GEO. T. PINCKNEY,
    HAROLD SERRELL.